(12) United States Patent
Georgy et al.

(10) Patent No.: US 11,352,136 B2
(45) Date of Patent: Jun. 7, 2022

(54) STRUCTURE OF PAYLOAD MODULE FOR STRATOSPHERIC DRONE

(71) Applicant: Airbus Defence and Space SAS, Toulouse (FR)

(72) Inventors: Pierre-Luc Georgy, Toulouse (FR); Pere Roca, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 71 days.

(21) Appl. No.: 16/765,291

(22) PCT Filed: Nov. 20, 2018

(86) PCT No.: PCT/FR2018/052919
§ 371 (c)(1),
(2) Date: May 19, 2020

(87) PCT Pub. No.: WO2019/097196
PCT Pub. Date: May 23, 2019

(65) Prior Publication Data
US 2020/0283149 A1    Sep. 10, 2020

(30) Foreign Application Priority Data

Nov. 20, 2017 (FR) ..................... 17 60937

(51) Int. Cl.
*B64D 9/00* (2006.01)
*B64C 39/02* (2006.01)

(52) U.S. Cl.
CPC .............. *B64D 9/00* (2013.01); *B64C 39/024* (2013.01); *B64C 2201/00* (2013.01)

(58) Field of Classification Search
CPC ..... B64D 9/00; B64C 39/024; B64C 2201/12; B64C 2201/123; B64C 2201/125; B64C 2201/127; B64C 2201/141
See application file for complete search history.

(56) References Cited

U.S. PATENT DOCUMENTS 4,697,761 A * 10/1987 Long .................. B64D 27/24
                                                    244/62
7,237,750 B2 * 7/2007 Chiu .................. A45C 13/02
                                                    244/119

(Continued)

FOREIGN PATENT DOCUMENTS

EP    2 868 577    5/2015
FR    2 863 584    6/2005

(Continued)

OTHER PUBLICATIONS

International Search Report for PCT/FR2018/052919, dated Mar. 29, 2019, 4 pages.

(Continued)

*Primary Examiner* — Benjamin P Lee
(74) *Attorney, Agent, or Firm* — Nixon & Vanderhye P.C.

(57) ABSTRACT

A payload module of a stratospheric drone including a casing (10), and payload equipment contained in the casing (10), wherein the casing includes a support structure (12) and a cover (15), the support structure being suitable for attachment to the drone at the front end thereof, relative to the direction of movement of the drone, and for extending forward from said front end, and in that the cover (15) and the payload equipment are supported by the support structure (12).

14 Claims, 2 Drawing Sheets

(56) References Cited

U.S. PATENT DOCUMENTS

| | | | | |
|---|---|---|---|---|
| 8,500,067 | B2* | 8/2013 | Woodworth | B64D 1/14 244/120 |
| 8,991,758 | B2* | 3/2015 | Earon | H05K 1/0268 244/119 |
| 9,957,037 | B2* | 5/2018 | Cornew | B64D 27/24 |
| 10,710,715 | B2* | 7/2020 | Yates | B64C 31/02 |
| 10,988,253 | B2* | 4/2021 | Perry | B64D 17/00 |
| 2003/0066932 | A1* | 4/2003 | Carroll | B64C 39/028 244/120 |
| 2009/0026316 | A1* | 1/2009 | Miller | B64C 39/024 244/123.1 |
| 2013/0193269 | A1* | 8/2013 | Zwaan | B64D 47/08 244/118.1 |
| 2014/0252156 | A1* | 9/2014 | Hiebl | B64C 39/024 244/3 |
| 2020/0108909 | A1* | 4/2020 | Elson | B64C 1/0009 |
| 2020/0223545 | A1* | 7/2020 | Brooks | B64D 27/24 |

FOREIGN PATENT DOCUMENTS

| | | | |
|---|---|---|---|
| GB | 2 161 774 | 1/1986 | |
| WO | WO-2017130137 A1 * | 8/2017 | B64C 39/024 |

OTHER PUBLICATIONS

Written Opinion of the ISA for PCT/FR2018/052919, dated Mar. 29, 2019, 6 pages.

Search Report for FR1760937, dated Aug. 10, 2018, 4 pages.

Van Achteren et al., "MEDUSA, an ultra light weight multi-spectral camera for a HALE UAV", Sensors, Systems, and Next-Generation Satellites XI, Proceedings of SPIE, Oct. 2007, 10.1117/12.737718, vol. 6744, 10 pages.

Anonymous, "Stratospheric Observatory for Infrared Astronomy", Wikipedia, https://en.wikipedia.org/wiki/Stratosrpheric_Observatory_for_Infrared_Astronomy, retrieved Aug. 10, 2018, 11 pages.

Euler, "Medusa, An Ultra Light Weight Multi-Spectral Camera For A UAV", Mechanics of Nano, Micro and Macro Composite Structures Politecnico di Torino, Jun. 18-20, 2012, 2 pages.

Van Achteren et al., "MEDUSA—A Wide Swath High Resolution Digital Camera For The Pegasus System", Delaure ISPRS Hannover (May 2007) 5 pages.

Van Achteren et al., "A Lightweight And Wide Swath UAV Camera For High Resolution Surveillance Missions", SPIE Security and Defense, Baltimore USA, 8713-46 (Apr. 2013) ten pages.

* cited by examiner

STRUCTURE OF PAYLOAD MODULE FOR STRATOSPHERIC DRONE

This application is the U.S. national phase of International Application PCT/FR2018/052919 filed Nov. 20, 2018, which designated the U.S. and claims priority to French patent application 17 60937 filed Nov. 20, 2017, the entire contents of each of which are hereby incorporated by reference.

FIELD OF THE INVENTION

The invention relates to a payload module of a high-altitude drone, this type of drone also known by the name stratospheric drone and being among the objects referred to as "high altitude pseudo-satellites", or as the acronym HAPS. This type of drone is intended to be sent into the stratosphere at an altitude of around 18 to 25 km, and to operate autonomously and unmanned, running exclusively on solar energy.

PRIOR ART

High-altitude drones or stratospheric drones are already known which are provided with an optical payload, in particular for observing and mapping the ground. The usefulness of this type of device is diverse.

First, the very high operating altitude places the drone beyond any air traffic, and also beyond the climate, in other words above the meteorological phenomena that occur in the troposphere, particularly jet streams. The constraints on using this type of drone are therefore more reduced than for aircraft flying within the troposphere.

The high altitude of this type of drone additionally allows them to operate on solar energy, and potentially to fly autonomously for several weeks or even months, without any specific need to land.

The operating altitude of these drones also gives them a very wide field of view for ground observation. Finally, and unlike spacecraft, stratospheric drones are subject to very reduced launching constraints since it is not necessary for them to escape the Earth's atmosphere.

To be able to operate exclusively on solar energy, stratospheric drones are smaller and lighter than conventional airplanes, but have a reduced carrying capacity. The payload of such a drone must therefore be as compact and as light as possible.

An example of a known stratospheric drone payload is the MEDUSA system, which is described in the article by T. Van Achteren et al. entitled "Medusa, an ultra light weight multi-spectral camera for a HALE UAV", in Proceedings of SPIE, 10/2007, 10.1117/12.737718.

The MEDUSA system has never been operated in stratospheric conditions, but a number of limitations can be anticipated due to its very design.

The MEDUSA payload is intended to be fixed in the nose of a high-altitude drone, and includes high-resolution optical equipment as well as electronic capture and processing equipment, and a casing forming a housing and support structure for the equipment it contains.

The optical equipment of the MEDUSA system has a fixed line of sight. The light rays captured by the optical equipment enter the casing through a porthole, and are reflected by a mirror positioned at 45° in order to direct these rays towards a system of lenses which focus them on the sensor of the optical equipment.

In addition, the swath width of the MEDUSA system is around 3 km.

It is therefore likely that the system's precision in capturing images of the Earth is very low. Indeed, as a high-altitude drone is very light and progresses at a low speed (about 80 km/h) in order to be able to be powered solely by solar energy, it is vulnerable to winds and highly likely to tilt or drift under the effect of wind. As the line of sight is fixed, it is not possible to adapt the observed area according to the position or path of the drone.

In addition, as the swath width is also limited, the lack of precision over the area observed by the drone cannot be compensated for by a very wide field of view which would encompass a wider area than the area of interest the drone is to observe.

Such low precision implies that the drone has to fly several times over the area of interest to be observed in order to ensure that images of that area have indeed been captured by the optical equipment.

There is therefore a need for a high-altitude drone payload that does not have the disadvantages of the prior art.

PRESENTATION OF THE INVENTION

In view of the above, a goal of the invention is to provide a payload module for a high-altitude drone that enables better payload equipment integration, for greater precision in aiming.

Another object of the invention is to provide a module of reduced mass and volume.

In this regard, an object of the invention is a payload module of a stratospheric drone, comprising:
a casing, and
at least one piece of payload equipment, contained in the casing,
the module being characterized in that the casing comprises a support structure and a cover, the support structure being suitable for attachment to the drone at the front end thereof, relative to the direction of movement of the drone, and for extending forward from said front end,
and in that the cover and the payload equipment are supported by the support structure.

Advantageously, but optionally, the cover may be removably mounted on the support structure.

In one embodiment, the support structure may comprise at least one support arm comprising a first end suitable for mounting on the drone and a free end extending in a direction forming an angle between 5 and 10° relative to the direction in which the first end of said support arm extends. In this case, the cover may then be mounted on the support arm.

In one embodiment, the support arm is hollow and is provided with two parallel internal walls extending along the main direction of the arm, said internal walls defining a housing between them.

Due to its being non-load bearing, the cover may comprise a through-hole.

In one embodiment, the casing comprises a through-opening formed at least in part by the through-hole of the cover. The support structure may in this case comprise two secondary arms extending in parallel from the free end of the support arm, and the through-opening is then defined jointly by an edge of the through-hole of the cover, the secondary arms, and the free end of the support arm.

The through-opening may advantageously have, in a main direction of the module, oblong lateral contours.

The invention also relates to a stratospheric drone comprising a payload module according to the above description.

The payload module according to the invention has a structure enabling simplified integration of the payload equipment. In fact, the casing of the module is formed by a support structure attached to the drone, and by a non-load bearing cover fixed to the support structure. The payload equipment is only carried by the support structure.

As the cover is non-load bearing, it may be made to be removable for easy access to the payload equipment.

It is also possible to arrange a through-opening in the cover, wide enough to integrate, into the casing, optical equipment with a movable line of sight. As the cover is non-load bearing, this opening has no unfavorable impact on the mechanical strength of the module.

Contrary to established preconceptions in the field of aerodynamics, this opening is devoid of any porthole or transparent covering which allows closing off the opening. This offers several advantages. One advantage is that the opening can be larger than if it were provided with a porthole, which makes it possible to increase the swath width of the module. Another is that the module has a reduced mass when there is no porthole.

It is the specific usage conditions of a high-altitude drone which make it possible to eliminate the porthole. Indeed, the reduced cruising speed compared to an airplane traveling in the troposphere, and the launch speed which is also reduced, significantly reducing vibrations in the module, thus reducing the aerodynamic stresses on the drone.

DESCRIPTION OF FIGURES

Other features, objects, and advantages of the invention will be apparent from the following description, which is purely illustrative and not limiting, and which is to be read with reference to the appended drawings in which.

DETAILED DESCRIPTION OF AT LEAST ONE EMBODIMENT OF THE INVENTION

General Description of the Module

Figure 1:
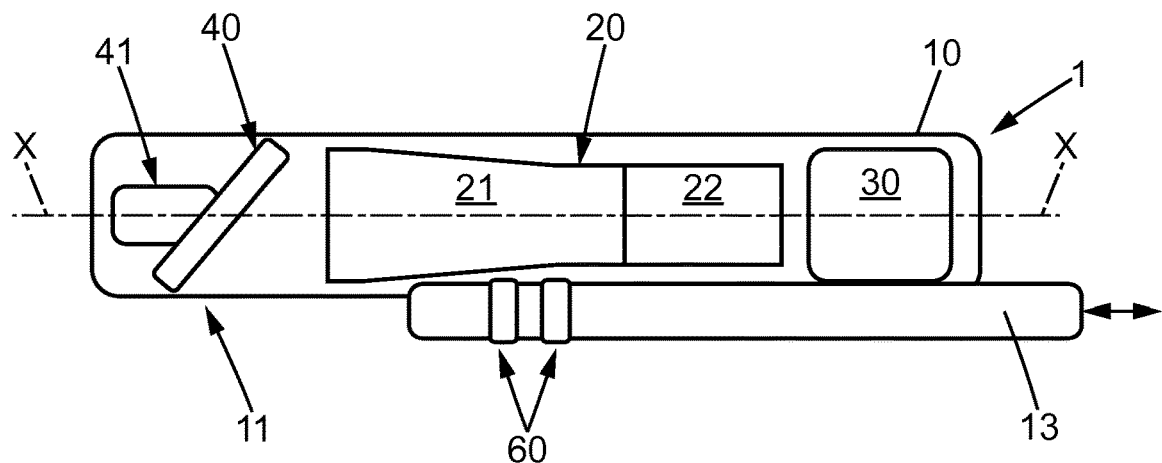
FIG. 1 schematically represents an example of a payload module according to one embodiment of the invention.
Figure 6:
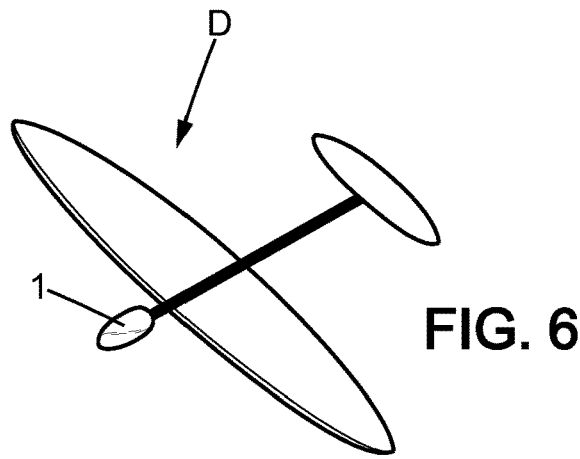

In FIGS. 1 and 6, an example payload module 1 of a high altitude drone D, or stratospheric drone, is schematically represented. As is schematically represented in FIG. 6, the payload module 1 is carried by the drone D, and is typically installed at the nose of the drone, in other words at its front end.

The module 1 is oblong in shape and extends along a main direction X-X, which substantially corresponds to a direction of movement of the module when it is mounted on a drone. In the following, front and rear characteristics will be defined with respect to the main direction X-X.

This payload module 1 comprises a casing 10 which houses at least one piece of optical equipment 20 and an electronic control and processing system 30. Optionally, the payload module 1 may also comprise one or more pieces of secondary optical equipment 60, described in more detail below.

The piece(s) of optical equipment and the electronic control and processing system form the so-called payload equipment.

The optical equipment 20 may, for example and without limitation, comprise a camera which may be suitable for capturing images in the visible or infrared range, or for example may be a laser pointer. The optical equipment 20 comprises an optical axis O represented in FIG. 3. The optical axis O is advantageously parallel to the main direction X-X of the module.

The optical equipment 20 is oriented towards the front of the module. It preferably comprises a first portion containing a set of optical elements 21, such as lenses and/or mirrors, and a second portion containing an electronic unit 22 for capturing or emitting light (in the case of a laser emitter), the first portion being located in front of the second portion.

The payload module 1 further comprises a mirror 40 which is arranged on the optical axis O, in front of and facing the optical equipment 20, being oriented so as to be able to reflect light rays coming from the ground towards the optical equipment 20.

In order to give the optical equipment 20 a movable line of sight, it is possible to swivel the mirror 40 by means of a mirror-swiveling device 41. The mirror 40 is elliptical in shape, and can be swiveled about at least one axis, preferably about two orthogonal axes, within respective angular ranges.

Figure 3:
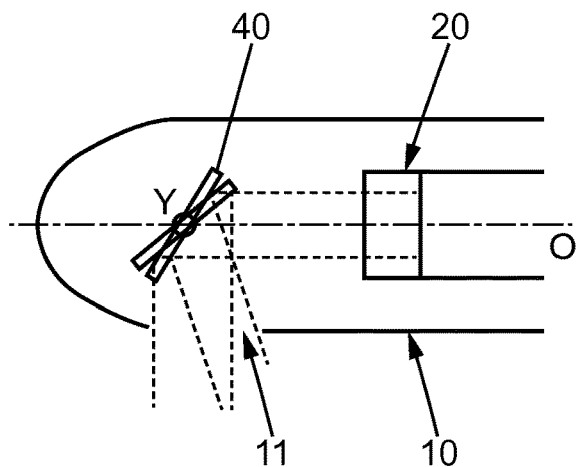

In particular, the mirror 40 preferably can be swiveled about a first axis which is parallel to the optical axis O, and advantageously coincident with the longitudinal or roll axis of the module 1, and about a second axis Y which is orthogonal to the optical axis O of the optical equipment and orthogonal to the vertical. This axis advantageously corresponds to the transverse axis of the module or the pitch axis. It is shown in FIG. 3.

On the first axis (roll axis), the mirror advantageously can be swiveled within an angular range of at least 50°, and preferably 60°.

On the second axis (pitch axis), the mirror advantageously can be swiveled within an angular range of at least 10°, and preferably 15°.

According to a preferred embodiment, the reference position of the mirror on which the angular swivel ranges of the mirror are centered, is a position in which the plane of the mirror forms an angle of 45° relative to the vertical, and the short axis of the mirror is parallel to the pitch axis. Alternatively, the angular swivel range of the mirror about the pitch axis is not centered on the reference position, but on the contrary the mirror can be pivoted about this reference position for example by 5° in one direction and 10° in the other direction.

The electronic control and processing system 30 comprises at least one control and processing circuit board 31, suitable for controlling the operation of: the optical equipment 20, the device 41 for swiveling the mirror 40, and where appropriate the secondary optical equipment 60.

This circuit board 31 comprises at least one processor, volatile memory (for example RAM memory), and additional memory (not shown) dedicated to the storage of data, for example to the storage of images captured by the optical equipment 20 and where appropriate by the one or more pieces of secondary optical equipment 60.

Module Casing

Figure 2A:
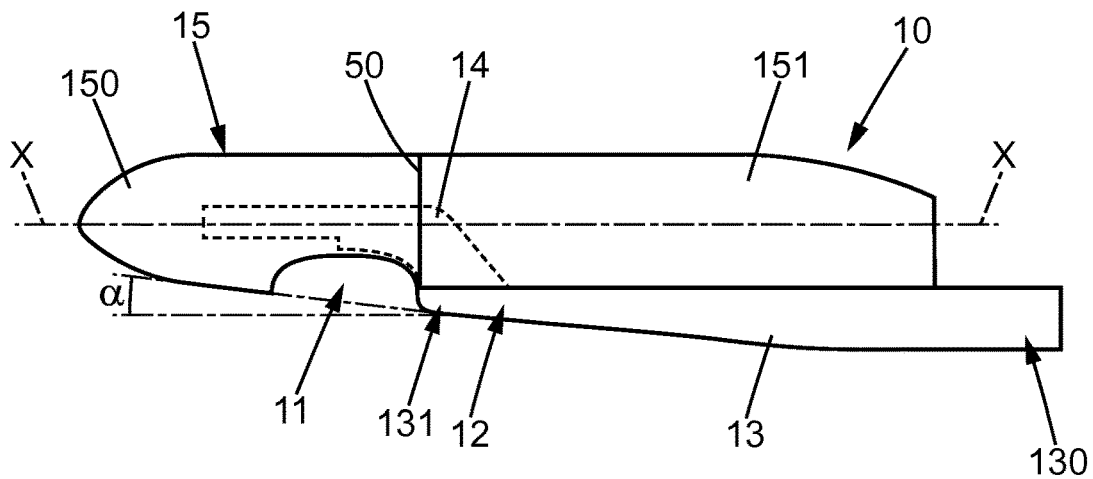
FIG. 2a represents the casing of the module.
Figure 2B:
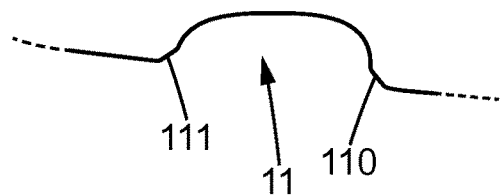
FIG. 2b represents an example of a through-opening in the casing of the module, FIG. 3 schematically represents the relative arrangements of the optical equipment, mirror, and through-opening of the casing.

Referring to FIGS. 2a, 2b, and 3, the casing 10 comprises a through-opening 11 shaped to allow the passage of light rays coming from the ground towards the swivelable mirror 40, so that they can be reflected by the mirror 40 towards the optical equipment 20, and vice versa if the optical equipment 20 is capable of emitting light rays.

Thus, preferably, and as schematically represented in FIG. 3, the through-opening 11 is shaped so that any light ray accepted or emitted by the optical equipment extending along the optical axis O, and reflected by the mirror 40, passes through the opening 11, and does so over the entire angular swivel range(s) of the mirror.

In particular, the through-opening 11 is advantageously centered on an angular position which is vertical to and directly below the optical axis O of the optical equipment ("at 6 o'clock" relative to the optical axis).

In addition, it has sufficiently large dimensions, along the optical axis O and perpendicular to the optical axis, to cover the angular swivel range of the mirror in each direction.

The through-opening 11 is without any porthole or any protection intended to close off the opening while leaving it transparent to light rays.

Indeed, placement of a porthole, whether flat or curved, would involve significant additional mass for the module, and furthermore would reduce the size of the through-opening.

It is also known to use a film known under the trade name Mylar to cover an opening, but this type of film is optically satisfactory only in the absence of applied stress. Consequently, this solution is not applicable to the invention since the film could be subjected to stresses in case of contact with dust or in case of wind.

In addition, the usage conditions of a stratospheric drone make it possible to do without with a porthole or other solution for closing off the opening, because the aerodynamic losses caused by this opening are reduced due to the low speed of movement of the drone and the weaker air currents in the stratosphere than in the troposphere.

As represented in FIGS. 2a and 2b, the through-opening 11 has a curvilinear edge able to reduce the aerodynamic losses caused by the opening. In particular, the lateral contours of the through-opening extending substantially in the main direction X-X of the module, therefore seen in FIGS. 2a and 2b in the direction of the pitch axis Y of the module, are advantageously oblong rather than semicircular.

In addition, as represented in FIG. 2b, the edge 110 of the opening facing towards the front of the module, in other words the edge of the opening located furthest back relative to the direction of movement of the module, is advantageously chamfered. The edge 111 of the rearward opening of the module may also be chamfered.

With reference to FIG. 2a, the casing 10 is also suitable for enabling this through-opening 11 to be created in the casing without impairing the mechanical strength of the module 1.

The casing 10 comprises a support structure 12 suitable for mounting on the drone. Typically, the payload module 1 forms the nose of the drone, meaning it forms its front end relative to its direction of movement.

The support structure 12 is also suitable for supporting all of the pieces of equipment which are placed in the module, in other words the optical equipment 20, the electronic control and processing system 30, the swivelable mirror 40, and the mirror-swiveling device 41. These pieces of equipment are fixed to the support structure.

The casing 10 further comprises a cover 15 which is suitable for mounting on the support structure 12, preferably removably, and the through-opening 11 is arranged in the cover 15. This opening is thus created in a non-load bearing structure, and can therefore potentially be large in size. The entire mass of the module elements is carried by the load-bearing structure mounted on the drone.

The support structure 12 comprises a support arm 13, which comprises a first end 130 suitable for mounting on the drone, for example by screwing or bolting, and a free end 131. The support arm 13 may be made of a composite material based on carbon fibers and structuring foam.

Most of the components of the payload module are mounted on the support arm 13, in particular the optical equipment 20 and the electronic control and processing system 30.

As can be seen in FIG. 2a, the support arm 13 is located vertical to and below the optical axis O ("at 6 o'clock" relative to the position of the optical axis), so that the through-opening and the support arm are aligned, the through-opening being located frontward of the support arm with respect to the direction of movement of the drone. According to a variant embodiment not shown, the support arm could also be situated vertical to and above the optical axis (at "12 o'clock"), and could support all the equipment placed in the module, by means of a structure for attaching equipment to the support arm. However, this variant embodiment is less advantageous than the first one in which, due to its position, the support arm 13 protects the components located inside the casing 13, during landing of the drone.

Returning to the first variant in which the support arm is located beneath the optical axis, advantageously and as shown in FIG. 2a, the free end 131 of the support arm can extend in a direction forming an angle α between 5 and 10° relative to the direction in which the first end 130 of the support arm extends and which is advantageously parallel to the optical axis.

During drone landing, this prevents the portion of the casing comprising the through-opening from touching the ground and therefore it is not damaged, and this also reduces the entry of particles into the module through the opening.

Figure 4:
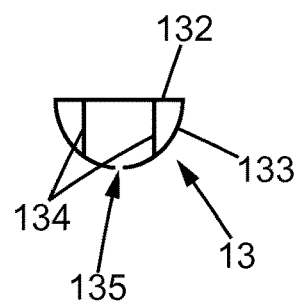
FIG. 4 is a cross-sectional view of the support arm of the support structure of the module, FIG. 5 schematically represents the implementation of thermal control in the rear part of the module, FIG. 6 schematically represents a stratospheric drone comprising a payload module.
Figure 5:
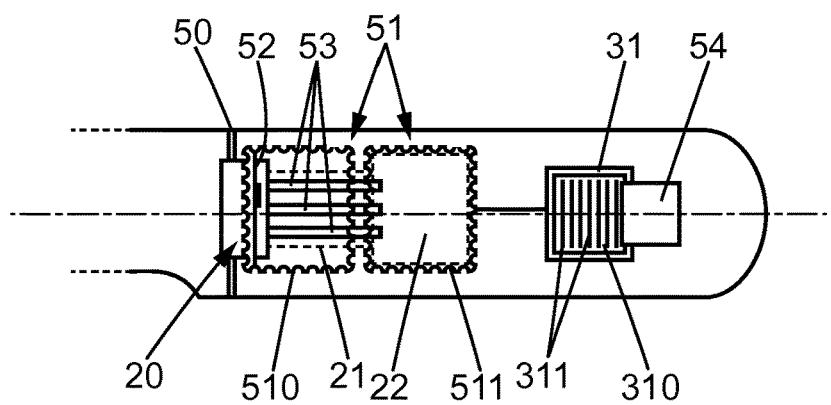

Referring to FIG. 4, the support arm 13 is hollow. It advantageously has a flat upper wall 132, forming a support surface on which the pieces of equipment of the module are mounted (optical equipment and electronic system 30), and a curvilinear lower wall 133. According to one particular embodiment, the lower wall 133 may be shaped so that the cross-section of the support arm 13 is a semicircle.

In addition, the support arm 13 comprises at least one reinforcing wall 134 which preferably extends for the entire length of the arm 13, parallel to the main direction of the arm 13 and substantially orthogonal to the flat wall 130.

In a preferred embodiment represented in FIG. 4, the support arm 13 comprises two reinforcing walls 134 parallel to each other, and defining therebetween a housing for positioning at least one piece of secondary optical equipment 60. In the case schematically represented in FIG. 1, two pieces of secondary optical equipment 60 are arranged in the support arm 13.

The secondary optical equipment 60 then has a fixed line of sight, pointed towards the ground. To achieve this, the secondary optical equipment 60 is positioned so that its optical axis is directed towards the ground. The support arm 13 then comprises, in its lower wall 133, at least one through-hole 135 through which light rays can reach the secondary optical equipment 60. The through-hole 135 is advantageously arranged vertically to the axis X-X of the module (at 6 o'clock). This through-hole preferably has no porthole or any other protection, because such protection would either be fragile or too heavy.

To be able to support the other pieces of equipment of the module, and in particular the swivelable mirror 40 and its swiveling device 41, which are arranged at the front of the module relative to the optical equipment 20 and at the front of the support arm 13, the support structure 12 further comprises at least one secondary arm 14, and preferably two secondary arms 14, extending forward from the free end 131 of the support arm 13.

Advantageously, the support structure 12 comprises two secondary arms 14 extending parallel to one another and at a distance from one another, making it possible to mount the mirror and its swiveling device between the secondary arms 14. For example, the secondary arms 14 may extend from two side edges of the main arm, along the Y axis.

Referring to FIG. 2a, in one advantageous embodiment, the cover 15 of the module is made of two parts. A first part 150 of the cover is located at the front of the module and houses the mirror, the mirror-swiveling device, and the secondary arm or arms 14 of the support structure. This first part 150 comprises a through-hole which at least partially defines the opening 11.

The front part 150 of the cover 15 is advantageously covered, on its inner surface, with a light-absorbing black coating, for example such as the material known under the trade name "Magic Black™" sold by the Acktar company, this coating preventing the propagation of stray light towards the optical equipment 20.

The second part 151 of the cover is located at the back of the module and houses the optical equipment 20 and the electronic control and processing system 30.

Advantageously, an opaque separating partition 50 extends between the optical equipment 20 and the cover 15, transversely relative to the main direction X-X of the module, so as to close off the space between the optical equipment 20 and the cover 15.

The partition 50 is preferably positioned at the interface between the front 150 and rear 151 parts of the cover. "At the interface" is understood to mean that the partition 50 is located at a distance of at most 10 cm, and preferably at most 5 cm, from the separation between the two parts of the cover.

In any event, this partition 50 is advantageously located in line with the first portion 21 of the optical equipment so as to close off the space between the first portion 21 and the cover 15. In addition, in the case where the optical equipment 20 comprises a lens for the entry of light rays, the separating partition 50 is advantageously located in line with the entry lens, and extends across the gap between the entry lens and the cover 15.

The wall of the separating partition 50 located towards the front part 150 of the cover is preferably also covered with the same light-absorbing black coating as the inner surface of this part 150. The separating partition 50 thus also contributes to reducing the propagation or reflection of stray light.

In an embodiment in which the support structure is provided with two secondary arms 14, the edges of the through-opening 11 may be defined jointly by the first part 150 of the cover, for the front of the opening, and by the secondary arms 14 and the main arm 13, for the back of the opening.

Thermal Aspects

Advantageously, the module 1 according to the invention is optimized from the thermal point of view to guarantee proper operation of the optical equipment 20 and of the electronic control and processing system 30 within the conventional range of temperatures in the stratosphere, namely from −80° C. to −50° C.

To do this, the opaque separating partition 50 is advantageously thermally insulating.

The partition thus makes it possible to separate the module into two spaces in which the thermal aspects are managed differently. The first space comprises the through-opening 11 and is therefore at ambient temperature. The closed second space comprises the optical equipment 20 and the electronic control and processing system 30. This space is capable of protecting these pieces of equipment, from the thermal point of view. Advantageously, the second space is capable of operating at a temperature of about −40° C. regardless of the temperature outside the module.

For the first space, the mirror 40 is advantageously made of a glass-ceramic known under the trade name Zerodur, and which has a very low coefficient of thermal expansion. This enables the mirror, even when there are significant thermal variations in this first space where the temperature is not regulated, to avoid undergoing a thermal expansion capable of bending the path of the light rays reflected by the mirror.

For the second space, the rear part 151 of the cover 15 is advantageously covered, on its outer surface, with a material that reflects infrared radiation, such as the material known by the trade name Teflon in its silver form ("Silver Teflon"), to limit the heating of components located in this part of the module.

In addition, the optical equipment 20 is advantageously covered with a thermally insulating covering 51, for example such as a covering comprising multiple layers of insulation and known by the acronym MLI. Advantageously, the first portion 21 comprising the optical elements of the optical equipment is covered with a strip 510 of insulating covering, and a heating element 52, typically a thermostat, is further positioned between the first portion 21 and the strip 510 of insulating covering 51. This heating element may for example be an electric wire or a resistor releasing heat by Joule effect. This heating element 52 is also advantageously programmed to heat only when the temperature of the portion 21 of the optical equipment comprising the optical elements, or the temperature of the air around this portion 21, is below a predetermined threshold.

The electronic capture or emission unit 22 of the optical equipment is also covered with a strip 511 of insulating covering. This unit generates heat because of its operation, so there is no need to add a heating element.

However, thermally conductive strips 53 are advantageously placed between the optical equipment and the insulating covering 510, the strips 53 extending from the electronic capture or emission unit 22 towards the portion 21 comprising the optical elements, so as to propagate heat from the electronic unit 22 towards said portion 21.

The circuit board 31 comprises a radiator 310 comprising a plurality of parallel plates 311 suitable for dissipating, by convection, the heat generated by the circuit board 31.

To maximize heat dissipation, the circuit board 31 is advantageously mounted in the module so that the plates 311 extend substantially perpendicularly to the main direction of the module.

In addition, heat dissipation by convection is lower in the stratosphere, due to the very low density of the air.

Consequently, to avoid overheating in the circuit board 31, the module further comprises a radiative plate 54 mounted on the circuit board 31, perpendicular to the plates 311 of the radiator 310. This plate makes it possible to increase the dissipated heat by radiative transfer, to supplement the dissipation by convection.

The radiative plate 54 may for example be made of anodized aluminum.

The arrangements described above concerning heat management of the module make it possible both to heat the optical equipment to prevent deformation of its optical components which would lead to warping the paths of the light rays, and to cool the capture and processing circuit board.

Specific Embodiment Example

According to one particular embodiment of the invention, the optical equipment 20 is a camera suitable for capturing images in the visible spectrum, at a frequency preferably between 3 and 10 Hz. Given the low speed of a stratospheric drone (maximum of about 80 km/h), the minimum frequency is sufficient to create a video by interpolating between two successive images captured by the camera.

The camera further comprises a focusing feature.

The field of view of the camera is about 1 km$^2$, and the camera can scan an area having a width of about 20 km due to the rotation of the mirror.

The module further comprises one or more secondary cameras 60 arranged in the support arm 13, these cameras having a greater field of view, for example about 500 km$^2$. One of the secondary cameras 60 may advantageously be a thermal infrared camera.

The invention claimed is:

1. A payload module of a stratospheric drone, comprising:
   payload equipment;
   a casing enclosing the payload equipment;
   wherein the casing comprises:
      a support structure configured to attach to a front end of the stratospheric drone, relative to a direction of movement of the stratospheric drone, and
      an exterior coved mounted to the support structure;
   wherein the support structure is configured to extend forward from said front end of the stratospheric drone,
   wherein the support structure supports the payload equipment so that the mass of said payload equipment is carried by the support structure, and
   wherein the support structure extends below the cover and the payload equipment.

2. The payload module according to claim 1, wherein the cover is removably mounted on the support structure.

3. The payload module according to claim 1, wherein the support structure comprises at least one support arm comprising a first end configured to mount on the drone and a free end extending in a direction forming an angle in a range of 5 degrees to 10 degrees relative to a direction in which the first end of said support arm extends.

4. The payload module according to claim 3, wherein the support arm is hollow and includes two parallel internal walls extending along a main direction of the arm, said two parallel internal walls defining a housing between them.

5. The payload module according to claim 1, wherein the cover comprises a through-hole.

6. The payload module according to claim 5, wherein the casing comprises a through-opening formed at least in part by the through-hole of the cover.

7. The payload module according to claim 6, wherein the support structure comprises at least one support arm including a first end configured to mount on the drone and a free end extending in a direction forming an angle in a range of 5 degrees to 10 degrees relative to a direction in which the first end of said support arm extends, and
   wherein the support structure further comprises two secondary arms extending in parallel from the free end of the support arm, and the through-opening is defined jointly by an edge of the through-hole of the cover, the secondary arms, and the free end of the support arm.

8. The payload module according to claim 6, wherein the through-opening has, in a main direction of the payload module, oblong lateral contours.

9. A stratospheric drone comprising the payload module according to claim 1.

10. A payload module of a stratospheric drone comprising:
   a support arm configured to attach to a forward end of the stratospheric drone;
   payload equipment supported by the support arm, wherein the support arm carries the mass of the payload equipment; and
   an exterior cover at least partially enclosing the payload equipment and supported by the support arm,
   wherein the support arm protrudes below the cover and the payload equipment.

11. The payload module of claim 10, further comprising:
   a casing including the cover and the support arm, wherein the casing encloses the payload equipment,
   an optical element included in the payload element, and
   a through hole on a lower surface of the casing;
   wherein the optical element is arranged to receive light passing through the through opening.

12. The payload module of claim 11, wherein the support arm has a forward edge rearward of a rear end of the through opening.

13. The payload module of claim 11, wherein the support arm includes secondary arms flanking the through opening.

14. The payload module of claim 11, wherein an upper edge of the support arm is parallel to an optical axis of the optical element, and
   the support arm includes a lower surface at a forward region of the support arm, wherein the lower surface forms an angle in a range of 5 degrees to 10 degrees with respect to the upper edge.

* * * * *